US005363779A

United States Patent [19]

Bury

[11] Patent Number: 5,363,779

[45] Date of Patent: Nov. 15, 1994

[54] SYSTEMS AND PROCESSES FOR PYROLYZING CONTAMINANTS ON FOUNDRY SAND AND COMBUSTING THE RESULTING GAS

[75] Inventor: Roland P. A. G. Bury, Marcinelle,

[73] Assignee: Praxair Technology, Inc., Danbury, Conn.

[21] Appl. No.: 160,532

[22] Filed: Dec. 1, 1993

[51] Int. Cl.[5] .......................... B09B 3/00; F23G 5/00

[52] U.S. Cl. .................................. 110/236; 110/246; 110/346; 164/5; 241/DIG. 10

[58] Field of Search ...................... 110/236, 346, 246; 241/DIG. 10; 164/5

[56] References Cited

U.S. PATENT DOCUMENTS

| | | | |
|---|---|---|---|
| 4,429,642 | 2/1984 | Deve | 110/236 |
| 4,541,796 | 9/1985 | Anderson | 431/187 |
| 4,544,013 | 10/1985 | Kearney et al. | 164/5 |
| 4,681,267 | 7/1987 | Leidei et al. | 241/23 |
| 4,907,961 | 3/1990 | Anderson | 431/8 |
| 4,974,528 | 12/1990 | Barcell | 110/236 X |
| 5,121,699 | 6/1992 | Frank | 110/246 |
| 5,299,618 | 4/1994 | Fumagalli | 164/5 |

OTHER PUBLICATIONS

WO91/08068, "A Method For Recovering Spent Foundry Sand By Roasting", Pio Fumagalli, Jun. 1991.

*LA Technique*, "Etude De Faisabilte De Recuperation De Sables Lies, Par Combustion (Gaz-Oxygene)", P. Fumagalli, p. 13, May 1992.

*Revue Francaise Des Metallurgistes* "Regeneration des Vieux Sables de Fonderie lies Chimiquement", Paglierini et al., pp. 68–71, Jun. 1992.

*Fonderia*, "La rigenerazione di sabbie lagate mediante processo di ossicombustione", Pio Fumagalli, pp. 38–41, Apr. 1991.

*Fonderia Fumagalli, Leghe Speciali,* Pio Fumagalli, "La Rigenerazione Delle Sabie Chimiche Esauste Di Fonderia Mediante Il Processo Di Ossicombustione Processo Di Fattibilita", pp. 1–33, Mar. 1989.

*Primary Examiner*—Edward G. Favors
*Attorney, Agent, or Firm*—Chung K. Pak

[57] ABSTRACT

The invention relates to combusting contaminants on foundry sand in a container (13) rotating about an axis (A) at a particular angle with a particularly placed oxygen-fuel burner (32). As the container (13) rotates about the axis (A), the oxygen-fuel burner (32) fires a flame and excess oxygen at a particular angle to enhance pyrolysis of the contaminants. The amount of excess oxygen is such that the resulting off gas contains at east 2% oxygen by volume, thus preventing or substantially minimizing products of incomplete combustion from leaving the container (13). After having pyrolyzed the contaminants, the firing of a flame and excess oxygen from the oxygen-fuel burner (32) may be replaced with oxidant dispersion an the bottom of the foundry sand. The resulting off gas from the container (13) may be treated in a post combustion furnace (7), a flue gas cooling means (8), a filtering device (9) and/or a pollutant removing means (11).

15 Claims, 3 Drawing Sheets

SYSTEMS AND PROCESSES FOR PYROLYZING CONTAMINANTS ON FOUNDRY SAND AND COMBUSTING THE RESULTING GAS

FIELD OF THE INVENTION

The invention relates to systems and processes for pyrolizing contaminants on foundry sand and combusting the gas resulting from the pyrolysis.

BACKGROUND OF THE INVENTION

The foundry industry uses sand, such as silica, chromite or olivine sand, extensively in forming molds which are suitable for casting molten metals. In forming the molds, the sand is combined with various binding agents. Usually, the binding agents employed are natural binders, such as linseed oil and bentonite, and chemical binders, such as organic resins. The type of the binding agents employed is dependent on the desired molding properties. However, bentonite and organic resin binders are widely utilized. Most of the organic resin binders are based on phenolic and furannic resins that form reticular structures under the influence of a catalyst together with or without the application of a moderate temperature.

The foundry industry recycles large quantities of spent sand having binder residues. Most often, the spent sand is recycled after being subject to a mechanical/attrition treatment followed by a screening step. The mechanical/attrition treatment allows to remove or screen out the binder residues that have been broken down to extremely fine particles. Such a treatment, however, also causes the sand grains to break and erode, thus resulting in removing or screening out large quantities of the sand with the binder residues. Typically around 20% of the sand is lost in such an operation. That is, millions tons of the sand are disposed worldwide annually as a waste. Even though a large quantity of the disposed spent sand contains bentonite (referred to as "green sand") and may be harmless to the environment, it is often combined or mixed with spent sand containing organic binders due the employment of bentonite and organic binders for making the different parts of a mold and/or due to the complexity of the foundry industry's operation. The disposed spent sand having the organic binders is normally hazardous to the environment.

To avoid the inefficiency and environmental hazard associated with the above recycling method, several thermal sand reclamation processes involving a fluid bed have been proposed. In these processes, electricity or natural gas is used for auxiliary heating while air is normally used as a fluidizing medium and as a means for burning organic residues present on the sand. These processes are useful for continuously treating large quantities of sand containing substantially identical binders and having substantially identical granulometry. However, they are neither effective nor efficient in treating different sands, i.e., sands having different granulometry and different binders, sequentially or in mixture since different operating parameters are needed for different sands. Moreover, crushing the spent (used) sand clods to very fine mesh for the fluidized bed treatment is a process handicap.

Consequently, WO 91/08068 has proposed a different thermal process for roasting foundry sand. Initially, the contaminated spent sand is charged into a rotatable furnace. The furnace rotates about an axis at an angle ranging from about 5° to about 15°, measured from vertical. Oxygen is injected at the bottom of the sand batch and diffuses throughout the sand batch. In the meantime, a flame front provided from a burner on the top of the furnace is directed to a upper surface of the sand batch. After the flame from the burner is ceased, oxygen is continuously injected to cause a progressive descent of the flame front until complete combustion of the contaminants has taken place. This thermal process, however, may suffer from certain disadvantages. First, the flame front may not descent progressively toward the bottom of the sand batch, when the sand contains limited burnable contaminants. The flame front from the top may be able to combust contaminants on the upper layer of the sand batch, but may not be able to reach the bottom layer of the sand batch. Second, the desired temperature uniformity may not be obtained since the flame from the burner, i.e., the tip of a flame, contacts only a small area of the upper layer of the sand batch. A certain portion of the sand batch, especially those at the bottom, may not be subject to the flame front and may still have contaminants when the operation is ceased. Third, the sand grain may be fractioning due to thermal shock since the sand grain is subject to rapid heating as the fire front progresses downward. The body of the sand batch, for example, may be subject to thermal shock because it does not appear to be preheated. Finally, an off gas containing substantial amounts of the partially pyrolized organic contaminants and CO may be released to the atmosphere since the injection rate for oxygen diffusing through the layer of the spent sand batch is normally kept at a pretty low level to avoid, among other things, channelling and local fluidization of the sand batch.

It is an object of the invention to reduce or eliminate the presence of CO and partially pyrolized hazardous organic matter in the off gas exiting a foundry sand roasting rotary furnace.

It is another object of the invention to promote temperature uniformity within a rotary furnace, i.e., the head space and sand batch within a rotary furnace, during pyrolysis.

It is yet another object of the invention to provide ways to control the temperature within a rotary furnace during pyrolysis and combustion to minimize any alteration of the sand grain structure.

It is a further object of the invention to reduce dust entrainment in the off gas exiting a rotary furnace.

It is an additional object of the invention to provide a thermal process useful for treating different sands effectively and efficiently.

It is an additional object of the invention to provide a thermal process useful for treating and decontaminating spent sand that has to be disposed of, such as sand fines and dust, so that such a disposal is harmless to the environment.

It is an additional object of the invention to allow the use of an iron melting rotary kiln for pyrolyzing spent sand and combusting the resulting gas during dwell times.

SUMMARY OF THE INVENTION

According to one embodiment of the invention, the above objectives and advantages are achieved by a process for roasting foundry sand contaminated by organic matter in a container capable of rotating about an axis, said process comprising:

(a) feeding said foundry sand contaminated with organic matter into said container;
(b) adjusting said container so that said axis is at an angle ranging about 0° to about ±10° , measured from horizontal;
(c) rotating said container about said axis; and
(d) firing at least one flame with excess oxygen in said container at an angle ranging from about 0° to about ±30° measured from horizontal or said axis, to produce an off gas containing oxygen and roasted foundry sand. The amount of said excess oxygen introduced into said container is such that pyrolysis products evolving from the sand batch as the contaminants are heated up and are completely combusted in the container head space. This is achieved when said off gas leaving the outle port of the container contains at least 2% by volume oxygen. This desired oxygen concentration in the off gas is maintained by analyzing the oxygen content of the off gas with an off gas oxygen analyzer and then adjusting the oxygen flow accordingly. The firing rate of an oxidant containing an oxygen concentration greater than about 25% by volume and fuel used to produce at least one flame and excess oxygen is controlled to cause to form recirculating matter and/or reduce particle entrainment in the off gas. Upon ceasing the firing of at least one flame and excess oxygen, oxidant may be dispersed at the bottom of said foundry sand in order to completely combust any hazardous organic matter and/or any carbon residues left on the sand. The carbon residue is formed as a result of pyrolyzing the organic matter on the spent sand with the oxygen-fuel burner.

According another embodiment of the invention, the above objectives and advantages are achieved by a combustion system capable of roasting foundry sand containing contaminants, said combustion system comprising:

(a) a rotary kiln comprising a container, a circular frame for surrounding and supporting said container so that said container is capable of rotating about an axis, a means for rotating said container coupled to said circular frame and a base pivotally coupled to said circular frame, wherein said container has, at least one side wall, at least one front wall defining an inlet port and at least one back wall defining an outlet port;
(b) a means for combusting foundry sand selected from the group consisting of a porous plug for distributing oxidant into said container or an oxygen-fuel burner for firing a flame and excess oxygen into said container, said means for combusting being designed to be fitted into and/or fastened to said inlet port of said container; and
(c) an off gas oxygen analyzer in fluid communication with said outlet port of said container.

Optionally, post treatment systems for the off gas, such as a post-combustion furnace, a flue gas cooling device, filtering means and/or a pollutant removing means may be provided.

As used herein the term "contaminants" means any substance, such as chemical or organic binders, on foundry sand, which is hazardous to the environment.

As used herein the term "organic matter" means any organic substance, such as phenolic and furannic resins, on foundry sand.

As used herein the term "different sands" means sands having different binding agents and/or sands having different granulometry.

As used herein the term "at least one oxygen-fuel burner" means one or more burners, which fires fuel and an oxidant having an oxygen concentration of greater than 22% by volume, preferably greater than 25% by volume, more preferably greater than 50% by volume, to produce a flame.

As used herein the term "excess oxygen" means the amount of oxygen sufficient to cause the off gas exiting a rotary kiln to contain oxygen.

As used herein the term "dwell time" means a period in which a rotary kiln is not used to melt metals.

DETAILED DESCRIPTION OF THE INVENTION

Figure 1:
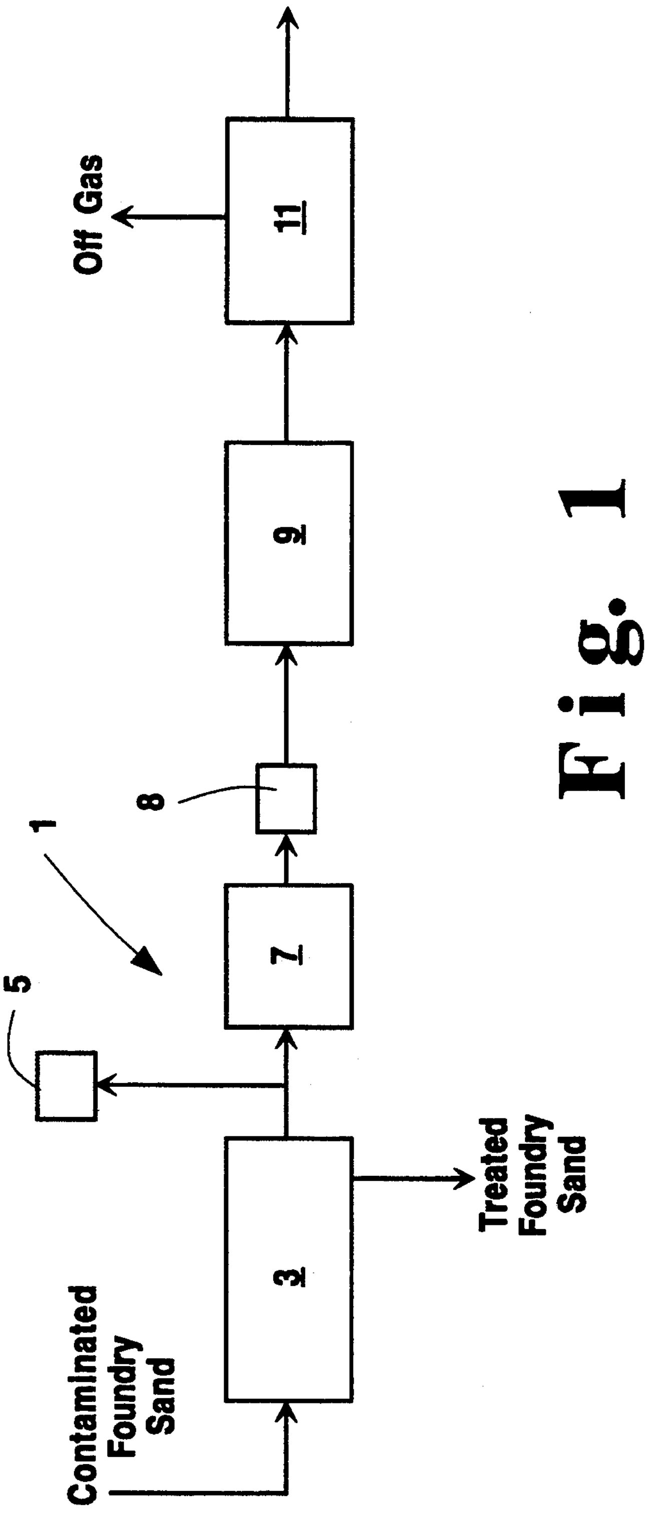
FIG. 1 is a diagrammatic view of a spent sand treatment system comprising a rotary kiln, an off gas oxygen analyzer, a post combustion furnace, a flue gas cooling device, a filtering means, and a pollutant removing device, which illustrates one embodiment of the invention.
Figure 2:
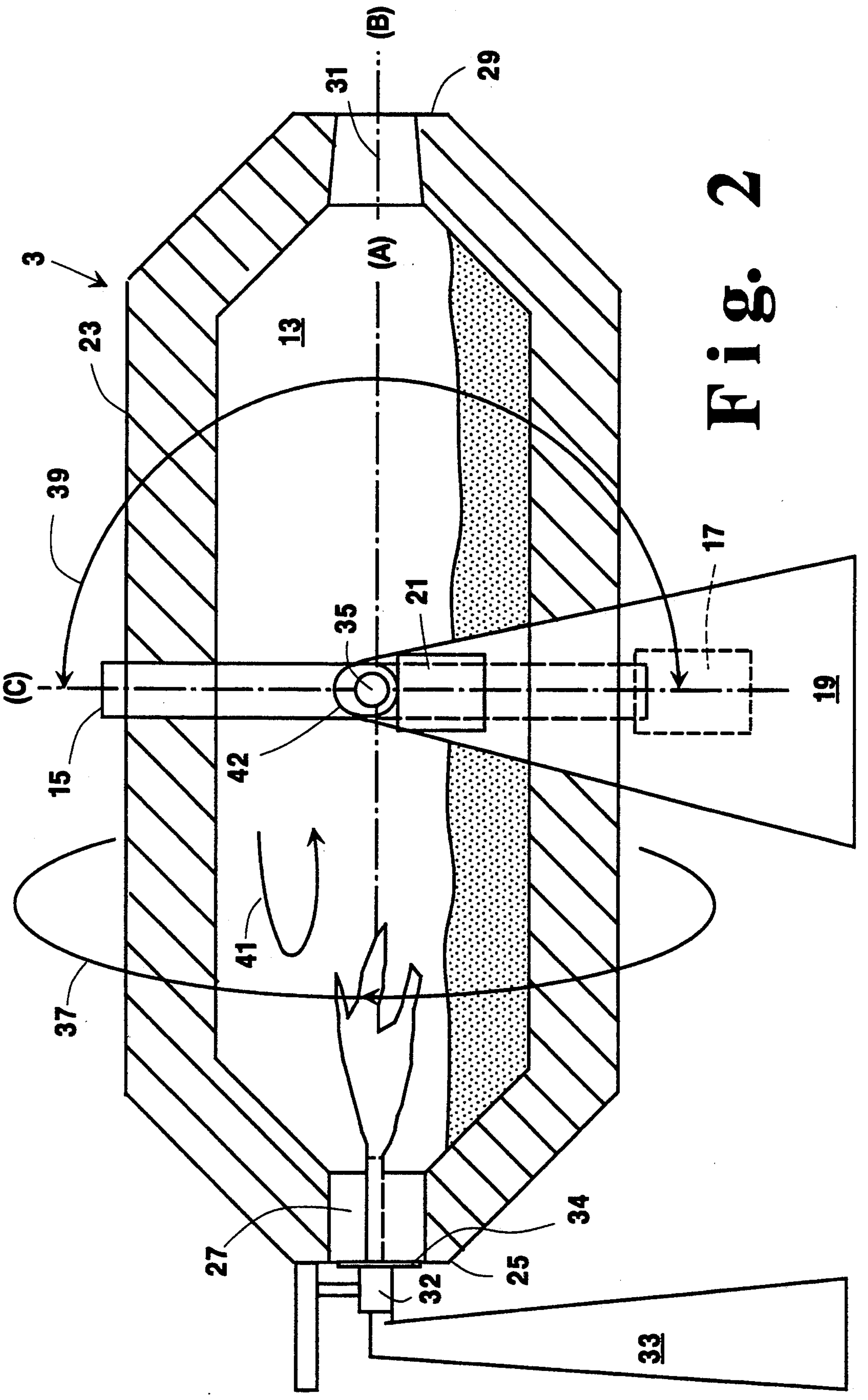
FIG. 2 is a cross-sectional view of a rotatable kiln having an oxygen-fuel burner illustrating one embodiment of the invention.
Figure 3:
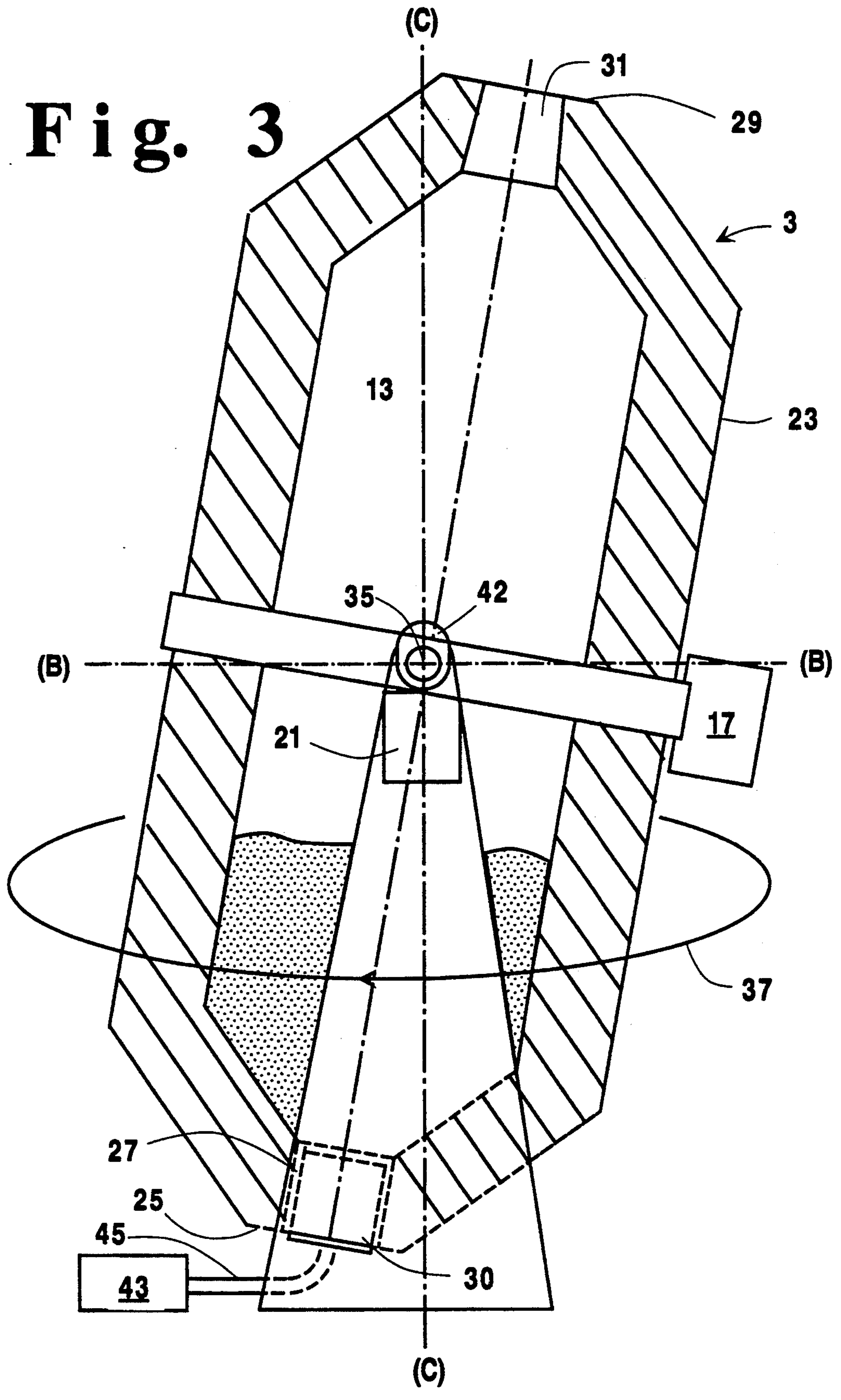
FIG. 3 is a cross-sectional view of a rotatable kiln having a porous plug illustrating one embodiment of the invention.

Referring to FIG. 1, a spent sand treatment system (1) is diagrammatically illustrated. The spent sant treatment system (1) includes a rotary kiln an oxygen analyzer (5) an off gas combustion furnace (7), a flue gas cooling means (8), a filtering means (9) and a pollutant removing system (11) for removing, e.g. $SO_2$. The rotary kiln (3), as illustrated in FIGS. 2 and 3, generally comprises a container (13), a circular frame (15), a first rotating means (17), a base structure (19), and a second rotating means (21). The container (13) has at least one side wall (23), at least one front wall (25) defining an inlet port (27) and at least one back wall (29) defining an outlet port (31). The inlet port (27) of the container (13) is designed to readily accommodate or readily remove a porous plug (30) and at least one oxygen-fuel burner (32). This container (13) is surrounded and supported freely rotatably by the circular frame (15). The circular frame (15) is equipped with rollers on its internal face to match with a rolling band fitted at the outside of the container side wall (23). This circular frame (15) is in turn supported by the base structure (19). Specifically, the base structure (19) is connected pivotally to the circular frame (15) via pivot pins (35), such as two trunnions. The first rotating means (17), such as an electrical motor, may be coupled to the outsid of the circular frame (15) in order to rotate the container (13) in the direction of an arrow (37) during foundry sand roasting. The second rotating means (21), such as a pneumatic or electric rotating device, may be attached to the base structure (19) in order to tilt or adjust the container (13) in the direction of an arrow (39) by means of a geal (42) located on the circular frame trunnions. This allows the container (13) to be tilted about 180° in the vertical plane (C).

Initially, at least a portion of foundry sand, which has been contaminated with chemical or organic matter, e.g., organic resin binders, is provided. Such sand may be crushed to the desired particle sizes. The foundry sand, which may or may not have been crushed, is loaded into the container (13) through the inlet port (27) using a hopper (not shown). The container (13) may be made with chemical and temperature resisting materials, such as refractory materials, alloys, steel or stainless steel. Specifically, the container shell may be made with heat resisting steel while lining its internal face with refractory materials. This container (13) is tilted or adjusted so that an axis (A) of the container (13) is at an angle ranging from about 0° to about ±10°, preferably 0° to about ±5°, measured from the horizontal plan (B). The tilting or adjustment of the container (13) is accomplished by actuating the second rotating means (21).

After or before tilting the container (13), at least one oxygen-fuel burner (32) is inserted into the inlet port (27). At least one oxygen-fuel burner (32) which may be hanging or attached to an outside structure (33), is pushed into its firing position by means of, e.g., a pneumatic jack. The oxygen-fuel burner is free standing inside of the inlet port (27). A plate (34) may be mounted to seal the inlet port (27) tightly in order to prevent excess atmospheric air from entering the container (13) during the operation.

At least one oxygen-fuel burner (32) employed may be any conventional oxygen-fuel burners capable of providing a flame and excess oxygen, e.g., about 50% to about 180% greater than a stoichiometric amount oxygen. The conventional oxygen-fuel burners generally have at least one passageway for firing an oxidant having an oxygen concentration of at least about 22% by volume, preferably at least about 25% by volume, and at least one passageway for firing fuel. The oxidant passageway or passageways should be capable of firing at least about 50% greater than, preferably at least 100% greater than, a stoichiometric amount of oxygen, e.g., the amount sufficient to produce a flame (react with the fuel) and excess oxygen. The preferred oxygen-fuel burners are aspirating oxygen-fuel burners such as those described and/or claimed in U.S. Pat. Nos. 4,541,796 and 4,907,961—Anderson, incorporated herein by reference. These aspirating burners have particularly designed oxygen passageways and a fuel passageway such that recirculating matter (41) can be formed upon firing the oxidant at a certain velocity and such that excess oxygen can be introduced easily. The formation of the recirculating matter (41) within the container (13) is found to promote temperature uniformity.

The oxygen-fuel burner (32) provided is positioned to direct a flame above the foundry sand in the container at an angle ranging from about 0° to about ±30°, preferably about 0° to ±10°, more preferably about 0° to ±5°, measured from the horizontal plan (B) or the axis (A). As the direction of the flame is closer to the horizontal plan (B) or the axis (A), flame energy can be efficiently and effectively utilized to burn pyrolysis gas evolving from the sand batch uniformly above the sand surface, hence promoting complete burning as well as temperature uniformity within the container (13). In other word, it is most desirable to fire a flame parallel to the axis (A) of the container (13) or the surface of the container (13). Of course, this may require the inlet port (27) defined in the front wall (25) to be located just above the surface of the foundry sand in the container, e.g., the center of the front wall (25).

Once the oxygen-fuel burner (32) is appropriately positioned or oriented, oxidant and fuel, such as natural gas, are delivered to the oxygen-fuel burner (32). The oxygen-fuel burner (32) may be lighted using a remote control ignition/control device (not shown) in order to produce a flame by combusting the fuel in the presence of oxidant. The firing rates of the fuel and oxidant are controlled so that the resulting off gas leaves the container (13) at a velocity below 3 meters per second, thus reducing or preventing dust entrainment. Optionally, the firing rate of oxidant may also be adjusted to form the recirculating matter (41) in order to promote temperature uniformity within the container (13). Normally, the oxidant is fired at a velocity of about 200 meters/second to about 300 meters/second to form the recirculating matter (41). The oxidant employed has an oxygen concentration of greater than 22% by volume, preferably greater than 25% by volume, more preferably greater than 50% by volume. It is most desirable to use technically pure oxygen.

The amount of oxidant delivered is such that the oxygen-fuel burner (32) fires a flame and excess oxygen into the container (13). The amount of excess oxygen normally causes the off gas, i.e., the gas formed from combusting pyrolysis gas emanating from the sand batch, to contain at least about 2% oxygen by volume or the resulting container atmosphere to contain at least about 2% oxygen by volume. In order to obtain such an off gas or an atmosphere, the amount of oxidant delivered to the oxygen-fuel burner (32) typically provides about 50% to about 150% over a stoichiometric amount of oxygen for producing a flame or combusting the fuel. For instance, the fuel, such as natural gas, may be delivered at a flow rate of about 15 Nm3/hour to about 60 Nm3/hour per ton of the foundry sand whereas the oxidant, e.g., technically pure oxygen, is delivered at a flow rate of about 45 Nm3/hour to about 240 Nm3/hour per ton of the foundry sand. The amount of oxidant delivered can be controlled or regulated to maintain the desired oxygen concentration within the container atmosphere, i.e., the desired off gas containing at least about 2% oxygen by volume. Initially, the oxygen content of the off gas leaving the container (13) through the outlet port (31) or the oxygen content of the container atmosphere is analyzed with the oxygen analyzer (5), such as a close-coupled extractive analyzer that aspirates a sample out of the furnace and passes it on a probe, e.g., a zironium oxide probe. The known close-coupled extractive analyzer is sold under the Trademark "THERMOX" and "CASA". The oxygen analyzer (5) may be connected to/a conduit which is in fluid communication with the outlet port (31) to analyze and transmit the oxygen concentration level in the off gas or the container atmosphere. Based on the analyzed and transmitted concentration level, the amount of oxidant delivered is adjusted or regulated manually or automatically to maintain the desired oxygen concentration within the container atmosphere or the off gas. Preferably, the adjustment to the oxidant delivery rate or the oxidant firing rate may be made relative to time laps or made using an automatic control loop that adjusts the oxygen to the fuel ratio from the readings of the off gas oxygen analyzer (5). By maintaining the desired oxygen concentration in the container atmosphere, i.e., in the off gas, any hazardous products of incomplete combustion or pyrolysis of the contaminants are prevented or substantially prevented from leaving the container (13) with the off gas, e.g., below the maximum tolerable limits. Moreover, the CO content in the off gas is substantially reduced, e.g., below the maximum tolerable limits.

During the firing of the flame from the oxygen-fuel burner (32), the container (13) is rotated about the axis (A) which is at an angle ranging from about 0° to about ±10°, preferably 0° to about ±5°, measured from the horizontal plan (B) (hereinafter referred to as "horizontal"). The rotation speed of the container (13) is controlled or regulated by adjusting or controlling the first rotating means (17). The rotation speed of the container (13) is maintained at normally less than about 5 revolutions per minute, preferably less than about 2 revolution per minute. Commonly, the firing of the flame and excess oxygen, together with the rotating of the container (13), is carried out for a period of about 20 to about 40 minutes. It is possible to fire the flame and excess oxygen and to rotate the container (13) for a period of less than 20 minutes or greater than 40 minutes, depending on the amount of the foundry sand treated, the size of the container (13).

Once the contaminants are substantially pyrolyzed, e.g., once the organic matter, such as phenol, is reduced to below 1 mg of the organic matter/ton of the foundry sand, the firing of the flame and the excess oxygen, as well as the rotation of the container (13), is ceased. The duration of the firing and rotation is also adjusted so that the temperature at a point of cessation is about 500° to about 800 ° C. The adjustment of the temperature enhances subsequent combustion of any remaining uncombusted partially pyrolyzed hazardous organic matter and/or any carbon residues that have resulted from the pyrolysis. The temperature at the point of cessation is inversely related to the amount of the remaining organic matter and the resulting carbon residues to be burned at the subsequent combustion stage.

After cessation, the oxygen-fuel burner (32) is removed from the inlet port (27). Then, the porous plug (30) is inserted or screwed into the inlet port (27). If it is not screwed into the inlet port (27), it is fastened, e.g., bolted, coupled or attached, so that the inlet port (27) of the container (13) is tightly sealed. The porous plug (30) is made with chemical and temperature resisting materials, such as refractory materials, alloys, steel or stainless steel. The porous plug (30), for example, may be a fabricated block of castable refractory with a plurality of embedded metal or alloy tubes having an internal diameter in the rang of about 0.5 to about 3 mm, preferably about 0.5 to about 1 mm.

To the porous plug (30), an oxidant source (43) is connected via a flexible hose (45). The flexible hose (45) is coupled to the base plate of the porous plug (30) preferably using a rotary joint. Upon connecting, oxidant is supplied from the oxidant source (43) to the porous plug (30). The amount of oxidant supplied is controlled to provide about 40 to about 160 $Nm^3$ of oxygen/hour per ton of foundry sand to burn any remaining organic matter and/or any carbon residues, namely about 0.5% to about 2.0% by weight of the organic matter and/or elemental carbon based on the total amount of the foundry sand, organic matter and carbon residues. As the oxidant is emitted from the porous plug (30), the container (13) is tilted or adjusted with the second rotating means (21) so that the axis (A) of the container is at an angle ranging from about ±1° to ±30° preferably from about ±5° to ±25°, measured from the vertical plan (C) (hereinafter referred to as "vertical"). Subsequent to the tilting, the oxidant emitting from the porous plug (30) is directed at an angle ranging from about ±1° to ±30°, preferably from about ±5° to ±25°, measured from the vertical plan (C) (hereinafter referred to as "vertical"), from the bottom of the foundry sand. The porous plug (30) produces effective dispersion of oxidant through out the sand batch, thus effectively combusting the left over carbon residues. The porous plug (30) may be even more effective as the size of the porous plug (30) increases. In the meantime, the container (13) is rotated about the axis (A) which is at an angle ranging from about 0° to ±30°, preferably from about ±5° to ±25°, measured from vertical. Rotating the container (13) about the axis, particularly the preferably axis, together with the use of the porous plug (30) in a particular manner, enhances dispersement and percolation of the oxidant. It is understood that any gas distributors less effective than or equivalent to the porous plug (30) may be used in lieu of the porous plug (30). Optionally, gas distributors or baffles may be used in lieu of the porous plug (30) to blow oxidant at a sufficient flow rate to fluidize and combust the foundry sand in the container (13). This fluidized treatment may require the container (13) to be modified accordingly (higher head space, means for preventing excessive dust entrainment, etc . . . ).

The oxidant is normally distributed throughout the foundry sand batch in the container (13). The oxidant may be air, an oxygen enriched air or technically pure oxygen. This oxidant is continuously or intermittently fed into the container (13) until the organic matter and/or carbon residues are completely combusted. Usually, the oxidant injection rate is adjusted to retain the end temperature of about 600° to about 800 ° C. and to complete the treatment (e.g., loss of ignition below 0.5%) in a period of about 15 to about 30 minutes. The timing and end temperature ensure complete combustion of the hazardous organic matter and carbon residue (e.g., loss of ignition below 0.5%). Upon complete combustion, the container (13) is tilted and the oxidant flow is ceased. The resulting hot treated sand is than poured through the outlet port (31).

During the combustion of the contaminants, e.g., carbon residues CO and possibly hazardous organic matter, the off gas leaves or exits the container (13). The off gas may be treated in the post combustion furnace (7) to further reduce the carbon monoxide content and the organic matter (if present) therein. The off gas can also be cooled in a flue gas cooling means (8) and then filtered in the filtering means (9) to remove any dust or particulates therein. Moreover, a pollutant treating means (11), such as adsorbents, getter materials or a condenser unit, may be used to treat the off gas. It is understood that the post combustion furnace (7), the cooling means (8), the filtering means (9) and the pollutant removing device (11) can be employed alone as an off gas post treatment, or in a different sequence. It is also understood that the post combustion furnace (7), the cooling means (8), the filtering means (9) and the pollutant removing device (11) may not be employed.

The following example serves to illustrate the invention. It is presented for illustrative purposes and is not intended to be limiting.

EXAMPLE

The rotary kiln (3) illustrated in FIGS. 2 and 3 was used to treat about 1.4 ton of foundry sand contaminated by phenolic resins. About 1.4 ton of this foundry sand was loaded into the container (13). Subsequent to the loading, an oxygen-fuel burner (32) was installed in the inlet port (27) of the container (13). The container (13) was then tilted so that its axis (C) was at an angle of about 0°, measured from horizontal. The container (13) was rotated about its axis at about 1 revolution per minute as the oxygen-fuel burner (32) fired a flame and excess oxygen. The flame and excess oxygen heated and pyrolized the phenolic resins on the foundry sand for about 29 minutes. During this period, natural gas (fuel) was delivered to the oxygen-fuel burner at about 25 $Nm^3$/hour. Oxygen, however, was delivered initially at about 120 $Nm^3$/hour for about 5 minutes and subsequently at about 140 $Nm^3$/hour for 24 minutes. Recirculating matter (41) was formed to promote temperature uniformity. The sand had an estimated temperature of about 600 ° C. by the end of thid period. The total amount of the fuel consumed per ton of foundry sand was about 8.6 $Nm^3$ while the total amount of the oxygen consumed per ton of foundry sand was about 47.1 $Nm^3$. This low fuel consumption was believed to be partly due to using a well soaked container (13) at the time the foundry sand was loaded, i.e., the foundry sand was loaded one hour and forty five minutes after the container was used for melting iron. Moreover, dust entrainment in the resulting off gas in the container (13) was minimized.

After terminating pyrolysis of the phenolic resins with the oxygen-fuel burner (32), the oxygen fuel burner in the inlet port (27) was replaced with a porous plug (30). The porous plug (30) was mounted in the inlet port (27) and tightly sealed the front wall (25). This porous plug (30), which was a fabricated block of castable alumina refractory with 10 embedded copper tubes having an internal diameter of about 2.76 mm, was in fluid communication with an oxygen source (43) through a flexible hose (45). The container 13 was then tilted so that the axis (A) of the container (13) was at an angle of about 0°, measured from vertical, i.e., in the vertical position. The container (13) was rotating about the axis (A) as the oxygen fed to the porous plug (30) was dispersed to the bottom of the foundry sand. The container (13) constantly rotated clockwise and counterclockwise about its axis (A) since no rotary joint was used to fit the flexible hose (45) to the base plate of the porous plug (30). At this vertical position, the oxygen dispersed was not percolating smoothly through the foundry sand. Consequently, after about two minutes, the container (13) was tilted again so that the axis (A) was at an angle of about 20°, measured from vertical, e.g., in inclined position. The container (13) constantly rotated clockwise and counterclockwise about its axis (A) as oxygen was constantly dispersed. The oxygen was introduced initially at about 103 $Nm^3$/hour for a period of about 3 minutes, and then at about 88 $Nm^3$/hour for a period of about 31 minutes. The amount of oxygen consumed per ton of the foundry sand is about 31.4 $Nm^3$. The estimated temperature within the container (3) was about 900 ° C. by the end of this treatment. After the treatment, the container (3) was tilted to pour the treated foundry sand into a collecting or conveying means. The resulting sand was analyzed for its phenolic content and its structure. While the loss ignition (LOI) was about 0.01% (the LOI was reduced from 4.95% on the spent sand to be treated to 0.012% after the treatment), granulometry rankings indicated that the sand structure was not substantially changed (Average Finesse Size (A.F.S.) index was 63.95 just before the treatment but was 61.21 after the treatment).

Although the invention has been described in detail with reference to certain embodiments, those skilled in the art will recognize that there are other embodiments of the invention within the spirit and scope of the claims.

What is claimed is:

1. A process for roasting foundry sand contaminated with organic matter in a container capable of rotating about an axis, said process comprising:

(a) feeding said foundry sand contaminated with organic matter into said container;

(b) adjusting said container so that said axis is at an angle ranging about 0° to about ±10°, measured from horizontal;

(c) rotating said container about said axis: and (d) firing at least one flame with excess oxygen in said container at an angle ranging from about 0° to about ±30°, measured from horizontal or said axis to produce an off gas containing oxygen and roasted foundry sand.

2. The process according to claim 1, wherein said at least one flame with excess oxygen is fired at an angle from about 0° to about ±10°, measured from horizontal.

3. The process according to claim 2, wherein said at least one flame with excess oxygen is fired parallel to said axis or parallel to the surface of said foundry sand containing organic matter.

4. The process according to claim 1, wherein the amount of said excess oxygen introduced into said container is such that said off gas leaving said container contains at least 2% by volume oxygen.

5. The process according to claim 1, further comprising analyzing said off gas containing oxygen and adjusting or regulating the amount of said excess oxygen introduced into said container based on the oxygen content of said off gas, whereby the oxygen content of said off gas is maintained at at lease 2% by volume during said firing.

6. The process according to claim 1, wherein said flame with excess oxygen is produced by firing fuel and an oxidant having an oxygen concentration of greater than about 25% by volume from at least one oxygen-fuel burner, with said oxidant having an oxygen concentration of greater than about 25% by volume fired at a rate sufficient to provide about 50% to about 180% by volume of oxygen more than that required for combusting said fuel or producing said flame.

7. The process according to claim 6, wherein said oxidant having an oxygen concentration greater than about 25% by volume is fired at a rate sufficient to form recirculating matter within said container.

8. The process according to claim 6, further comprising adjusting or regulating the firing rate of said oxidant and fuel so that said off gas flows at a velocity below 3 meters/second.

9. The process according to claim 1, further comprising ceasing said firing and dispersing oxidant at the bottom of said foundry sand until the loss on ignition is below about 0.05%.

10. The process according to claim 9, further comprising tilting said container so that said axis is at an angle ranging about ±0° to about ±30°, measured from vertical, rotating said container about said axis and introducing said oxidant at the bottom of said foundry sand at a flow rate of about 40 to about 160 $Nm^3$/hour per ton of said foundry sand.

11. The process according to claim 9, wherein said oxidant is dispersed after adjusting the temperature within said container to about 500° to about 800° C. and/or after reducing said hazardous organic matter present on said foundry sand to below 1 mg of said hazardous organic matter/kg of said foundry sand.

12. The process according to claim 1, further comprising treating said off gas from said container in a post combustion furnace, a flue gas cooling means, a filtering means and/or a pollutant removing means.

13. A combustion process comprising:
- (a) providing a rotary kiln capable of roasting foundry sand containing contaminants, said rotary kiln comprising a container capable of being rotatable about an axis, said container having at least one side wall, at least one front wall defining an inlet port and at least one back wall defining an outlet port, with said inlet port being designed to readily accommodate or remove at least one oxygen-fuel burner and a porous plug;
- (b) providing foundry sand containing contaminants in said container;
- (c) inserting at least one oxygen-fuel burner in said inlet port;
- (d) injecting fuel and oxygen into said at least one oxygen-fuel burner wherein the amount of said oxygen injected is at least 50% greater than a stoichiometric amount;
- (e) firing, from said at least one oxygen-fuel burner, a flame and excess oxygen into said container;
- (f) ceasing said firing;
- (g) removing said at least one oxygen-fuel burner from said inlet port;
- (h) inserting a porous plug, which is in fluid communication with an oxidant source, in said inlet port;
- (i) tilting said container so that said porous plug is capable of dispersing oxidant at an angle ranging about 0° to about ±30°, measured from vertical and so that said axis is at an angle ranging about ±0° to about ±30°, measured from vertical;
- (j) rotating said container about said axis; and
- (k) passing oxidant from said oxidant source to said container through said porous plug.

14. A combustion system capable of roasting foundry sand containing contaminants, said combustion system comprising:
- (a) a rotary kiln comprising a container, a circular frame for surrounding and supporting said container so that said container is capable of rotating about an axis, a means for rotating said container coupled to said circular frame and a base pivotally coupled to said circular frame, wherein said container has, at least one side wall, at least one front wall defining an inlet port and at least one back wall defining an outlet port;
- (b) a means for combusting foundry sand selected from the group consisting of a porous plug for distributing oxidant into said container or an oxygen-fuel burner for firing a flame and excess oxygen into said container, said means for combusting being designed to be fitted into and/or fastened to said inlet port of said container; and
- (c) an off gas oxygen analyzer in fluid communication with said outlet port of said container.

15. The combustion system according to claim 14, further comprising a post combustion furnace, a flue gas cooling means, a filtering means, and/or a pollutant removing means, which is in fluid communication with said outlet port of said container.

* * * * *